US012637016B2

(12) United States Patent
Yilmaz

(10) Patent No.: US 12,637,016 B2
(45) Date of Patent: May 26, 2026

(54) COMPONENT ASSEMBLY FOR A VEHICLE

(71) Applicant: Volkswagen Aktiengesellschaft, Wolfsburg (DE)

(72) Inventor: Zafer Yilmaz, Wolfsburg (DE)

(73) Assignee: Volkswagen Aktiengesellschaft, Wolfsburg (DE)

( * ) Notice: Subject to any disclaimer, the term of this patent is extended or adjusted under 35 U.S.C. 154(b) by 260 days.

(21) Appl. No.: 18/378,630

(22) Filed: Oct. 10, 2023

(65) Prior Publication Data

US 2024/0116456 A1        Apr. 11, 2024

(30) Foreign Application Priority Data

Oct. 11, 2022    (DE) ..................... 10 2022 210 691.1

(51) Int. Cl.
B60R 11/02        (2006.01)
B60R 7/06         (2006.01)
B60R 11/00        (2006.01)

(52) U.S. Cl.
CPC ................ B60R 11/02 (2013.01); B60R 7/06 (2013.01); B60R 2011/0005 (2013.01)

(58) Field of Classification Search
CPC ... B60R 11/02; B60R 7/06; B60R 2011/0005; B60R 16/02; B60R 16/0215
USPC ................ 248/231.81; 296/37.1, 37.12, 37.8
See application file for complete search history.

(56) References Cited

U.S. PATENT DOCUMENTS

| | | | | |
|---|---|---|---|---|
| 4,708,895 A | | 11/1987 | Mizusawa | |
| 5,385,378 A | * | 1/1995 | Hakamada | ............ B60R 21/205 |
| | | | | 16/374 |
| 7,926,861 B2 | * | 4/2011 | Merlo | ........................ B60R 7/06 |
| | | | | 224/483 |
| 8,807,622 B2 | * | 8/2014 | Fukumoto | ................. F16F 1/12 |
| | | | | 296/37.8 |
| 10,442,362 B2 | * | 10/2019 | Oldani | ....................... B60R 7/06 |
| 10,532,707 B2 | | 1/2020 | Troffer et al. | |
| 11,021,059 B2 | | 6/2021 | Feng et al. | |
| 11,215,213 B2 | | 1/2022 | Ulsamer et al. | |
| 11,535,169 B2 | * | 12/2022 | Yilmaz | .................. B60K 35/53 |
| 2009/0266858 A1 | * | 10/2009 | Vander Sluis | ............ B60R 7/08 |
| | | | | 292/173 |
| 2011/0187145 A1 | | 8/2011 | Ishikawa | |
| 2020/0324712 A1 | * | 10/2020 | Yilmaz | .................. B60K 35/60 |
| 2022/0089094 A1 | * | 3/2022 | Park | ........................... B60R 7/06 |
| 2022/0097618 A1 | * | 3/2022 | Rhyne | .................... B60K 35/22 |

FOREIGN PATENT DOCUMENTS

| | | |
|---|---|---|
| CN | 103350645 A | 10/2013 |
| CN | 103587474 A | 2/2014 |
| CN | 203844618 U | 9/2014 |

(Continued)

*Primary Examiner* — Todd M Epps
(74) *Attorney, Agent, or Firm* — Muncy, Geissler, Olds & Lowe, P.C.

(57)        ABSTRACT

A component assembly for a vehicle. The component assembly has at least one retaining element for the direct or indirect connection of at least two components to a load-bearing vehicle structure, wherein the retaining element has a recess. The first component has at least one mounting aid inserted into the recess. The second component has at least one external projection facing the retaining element, which is mounted in the same recess of the retaining element in the mounted state.

9 Claims, 6 Drawing Sheets

(56) References Cited

FOREIGN PATENT DOCUMENTS

| CN | 203995983 | U | 12/2014 |
|----|-----------|---|---------|
| CN | 213384082 | U | 6/2021 |
| DE | 102006025705 | A1 | 12/2007 |
| DE | 102013008761 | A1 | 11/2014 |
| DE | 102013220698 | A1 | 4/2015 |
| DE | 102014222441 | A1 | 5/2016 |
| DE | 102016214203 | A1 | 2/2018 |
| DE | 102017128814 | A1 | 6/2019 |
| DE | 102019205344 | A1 | 10/2020 |
| DE | 102021125531 | B3 | 9/2022 |
| JP | H082338 | A | 1/1996 |

* cited by examiner

COMPONENT ASSEMBLY FOR A VEHICLE

This nonprovisional application claims priority under 35 U.S.C. § 119(a) to German Patent Application No. 10 2022 210 691.1, which was filed in Germany on Oct. 11, 2022, and which is herein incorporated by reference.

BACKGROUND OF THE INVENTION

Field of the Invention

The invention relates to a component assembly for a vehicle, comprising as components at least one retaining element, a first component and a second component.

Description of the Background Art

Component assemblies for vehicles are also known as mounting systems or vehicle cockpits, which are dedicated to different aspects in the arrangement or assembly of the components. A wide variety of retaining elements are also known from motor vehicle construction, which are used to fasten or store components on vehicle-side structures or beams. In a vehicle designated VW380 (Golf 8) of the applicant, retaining elements are installed which have mounting openings for attaching a first component in the form of a glove compartment and separate receptacles for a second component in the form of a CPU holder.

From DE 10 2019 205 344 A1, which corresponds to US 2020/0324712, which is incorporated herein by reference, a mounting system for accommodating at least one component, in particular an electrical device, in an instrument panel of a vehicle is known. For optimized use of the installation space behind a glove compartment, the mounting system has a guide that creates a non-linear trajectory for the electrical device during mounting. As a result, the device (e.g., a CPU) can be positioned in an instrument panel in a space-efficient manner.

DE 10 2014 222 441 A1, which corresponds to US 2017/0232912, which describes a cockpit module for a motor vehicle that includes a control unit, a wiring harness for the electrical connection of the control unit and a glove compartment. In order to avoid lengths of the wiring harness required for installation, which are later superfluous, the electrical connection is located on one side of the control unit facing the interior of the motor vehicle.

DE 10 2006 025 705 A1 concerns a modular vehicle cockpit that has a load-bearing basic structure and at least one submodule. For the simplest possible and thus most cost-effective cockpit assembly, guides are provided on the basic structure and corresponding guide elements on the submodule, which define a guide path along which the submodule can be moved from a starting position to the specified end position.

DE 10 2013 008 761 A1 is dedicated to the avoidance of noise generated by components in the interior of a motor vehicle and proposes an instrument panel that includes an integrated bracket to accommodate a control panel or a storage compartment. A protrusion is provided on the instrument panel or on a fastening carrier on which the bracket is fitted to the rear of the system in the mounted state for support, which avoids disturbing noise development as a result of vibrations.

SUMMARY OF THE INVENTION

It is therefore an object of the present invention to provide a component assembly for a vehicle which is simplified in terms of mounting effort and whose component costs are reduced and which makes optimum use of the available installation space.

In an exemplary embodiment, at least one retaining element is provided in the component assembly for the direct or indirect connection of at least two components to a load-bearing vehicle structure. The retaining element can have a recess. The first component can have at least one mounting aid that is inserted into the recess. The second component can have at least one external projection facing the retaining element, which is mounted in the same recess of the retaining element in the assembled state.

In particular, this vehicle structure may be a vehicle crossmember in the front area (viewed in the direction of travel) behind the visible cockpit area. The second component comprises at least one external projection, i.e., a projection disposed on the external side of the load-bearing vehicle structure and/or the outside facing the retaining element. In the mounted state, this projection is received and stored at least in sections by the recess of the retaining element. The bearing shall be carried out in such a way that acceleration and/or weight forces of the second component and, where appropriate, of objects received by or held by the component are absorbed via the recess and dissipated to the vehicle structure. Preferably, the mounting aid of the first component is inserted into the recess before the projection is inserted into the recess in the further mounting process.

An advantage of the invention is the dual function of the recess: on the one hand, it incorporates the mounting aid to simplify the manufacturing process and thus facilitates mounting. On the other hand, the same receptacle serves to support the projection in a force-absorbing manner. As a result, the retaining element can be designed comparatively small, which opens up the possibility that the second component extends further or with increased volume towards the front of the vehicle, because the projection of the second component in this direction is only slightly limited by the retaining element. Since the retaining element can be designed to be particularly small and compact, the component assembly according to the invention is characterized by very low material requirements and thus low component costs and reduced weight.

The first component can be a device holder for an electrical device and the second component can be a glove compartment with a glove box having the at least one external projection (hereinafter also referred to as the box projection). Here, it is particularly advantageous if the retaining element(s) can be very small and compact and thus the installation space (viewed in the direction of travel) behind the retaining elements can be optimally utilized for the glove compartment. As a result, the glove compartment can have a particularly large receiving space.

In order to ensure a simple and, in particular, reliable fixation of the first component (device holder) in the event of an accident (crash event) and thus in particular of a device contained in the device holder (such as a central computer), it is provided that the first component can have a retaining pin which is used to absorb weight forces and/or acceleration forces in a bearing opening of the retaining element.

A particularly simple and elegant mounting of the first component is possible after a preferred further development of the invention by the fact that the mounting aid can be designed as a mounting hook. In this way, the first component can first be temporarily hooked in during mounting, then swiveled into its final position and fixed there in the bearing opening of the retaining element, e.g., by means of the retaining pin, which absorbs force.

With regard to an increased permissible weight of the components, it is provided that at least two similarly designed retaining elements can be provided. As a result, a very favorable and symmetrical force absorption can be realized, wherein the uniform design of the retaining elements creates cost advantages in production.

A particularly compact and easy-to-assemble preferred design of the invention provides that the mounting aid has a passage recess which, in the mounted state, is at least partially penetrated by the projection.

In order to dampen vibrations and to avoid noise, it is provided that at least one elastic element can be arranged between the projection and the mounting aid, at least in sections, in the mounted state.

The retaining pin can be supported in the mounted state via an elastic element in the bearing opening of the retaining element.

In order to ensure a particularly structurally strong and, in particular, safe mounting of the first component or the device included therein in the event of a rear-end collision, it is provided that the retaining pin can be bolted to the retaining element and/or to the load-bearing vehicle structure. This has the additional advantage that a particularly high level of direct force transmission into the vehicle structure is possible, so that intermediate components, such as a glove compartment frame, can be designed to be correspondingly lighter and thus more material- and weight-saving.

Further scope of applicability of the present invention will become apparent from the detailed description given hereinafter. However, it should be understood that the detailed description and specific examples, while indicating preferred embodiments of the invention, are given by way of illustration only, since various changes, combinations, and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
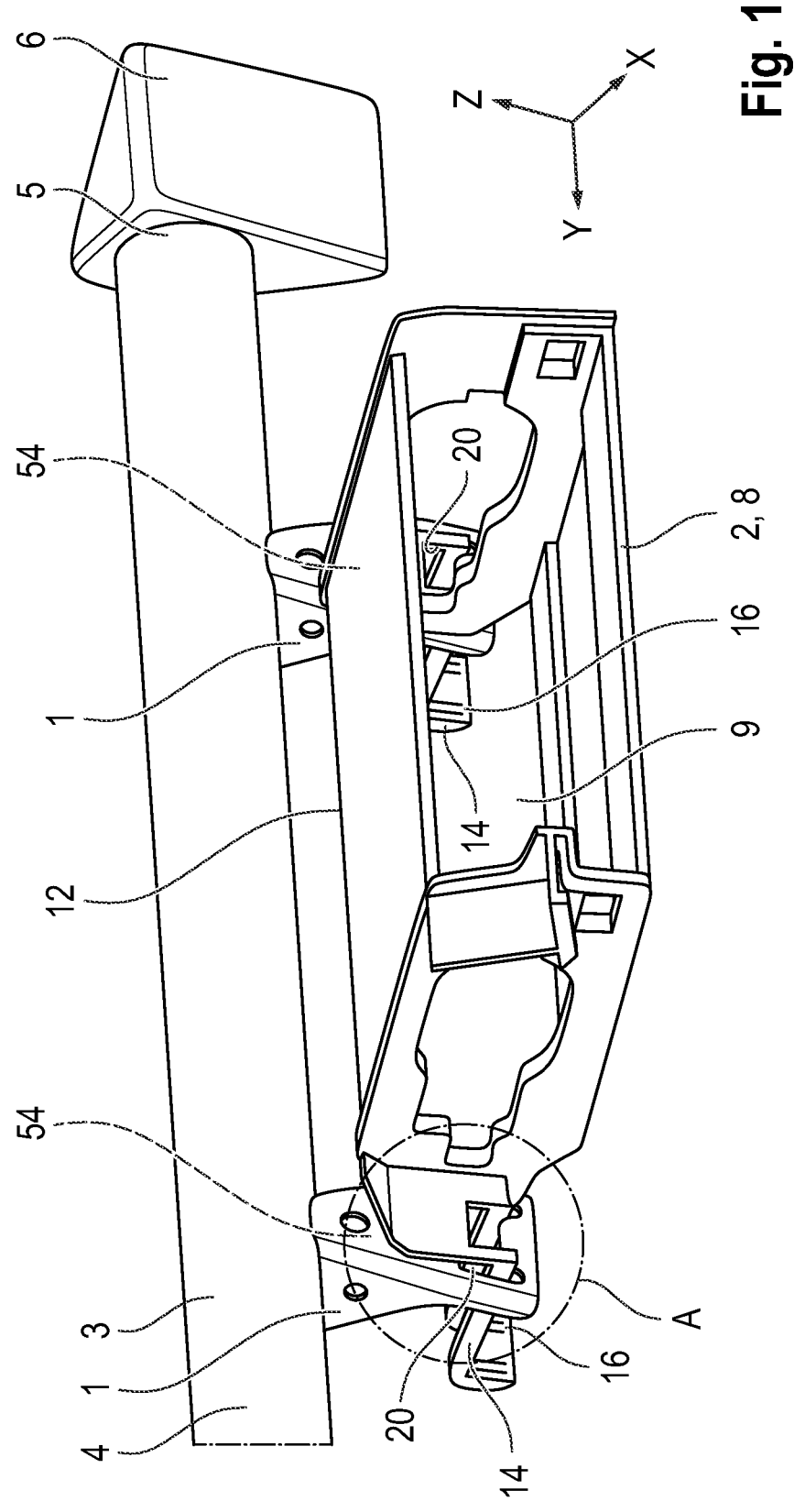
FIGS. 1 to 3 show schematically different mounting steps of a component assembly according to an example of the invention.

FIG. 1 shows in a first mounting step assembled components of the component assembly according to the invention, namely two identical retaining elements 1 and a first component 2, as well as a load-bearing vehicle structure 3. The vehicle structure 3 is designed as a cross member 4, which extends in the vehicle transverse direction Y. FIG. 1 shows only the right-hand end 5 of the cross member 4. The end 5 is connected to other load-bearing structural elements of the vehicle in a well-known manner via a mounting flange 6. The first component 2 is designed as a device holder 8 for an electrical device, in particular a central computer, which is received safely and crash-resistant above a glove compartment (FIG. 3) in a slide-in opening 9 provided for this purpose and is mechanically firmly connected to the device holder 2 in a manner that is known per se and therefore not explained in more detail.

In the rear area 12, which points to the front of the vehicle when viewed in the longitudinal direction of the vehicle X, two mounting aids 14 are formed, which are designed in one piece with the injection-molded plastic device holder 8. The mounting aids 14 have mounting hooks 16 at the free end and are pushed (inserted) by a recess 20, which is formed in the respective retaining element 1. As a result, the mounting hooks 16 engage behind the respective recess 20. In other words, during the mounting process, the first component 2 (device holder 8) with its mounting hooks 16 can first be (provisionally) hooked into the recesses 20 and then swiveled about 90° counterclockwise to the end position shown in FIG. 1.

In the example shown, the retaining elements 1 are directly connected to the cross member 4, e.g., welded. They thus allow any forces to be dissipated directly into the vehicle structure 3. Of course, the retaining elements 1 could also be attached to other intermediate components as viewed in the flow of force. Then the forces would be indirectly introduced into the vehicle structure 3.

Figure 2:
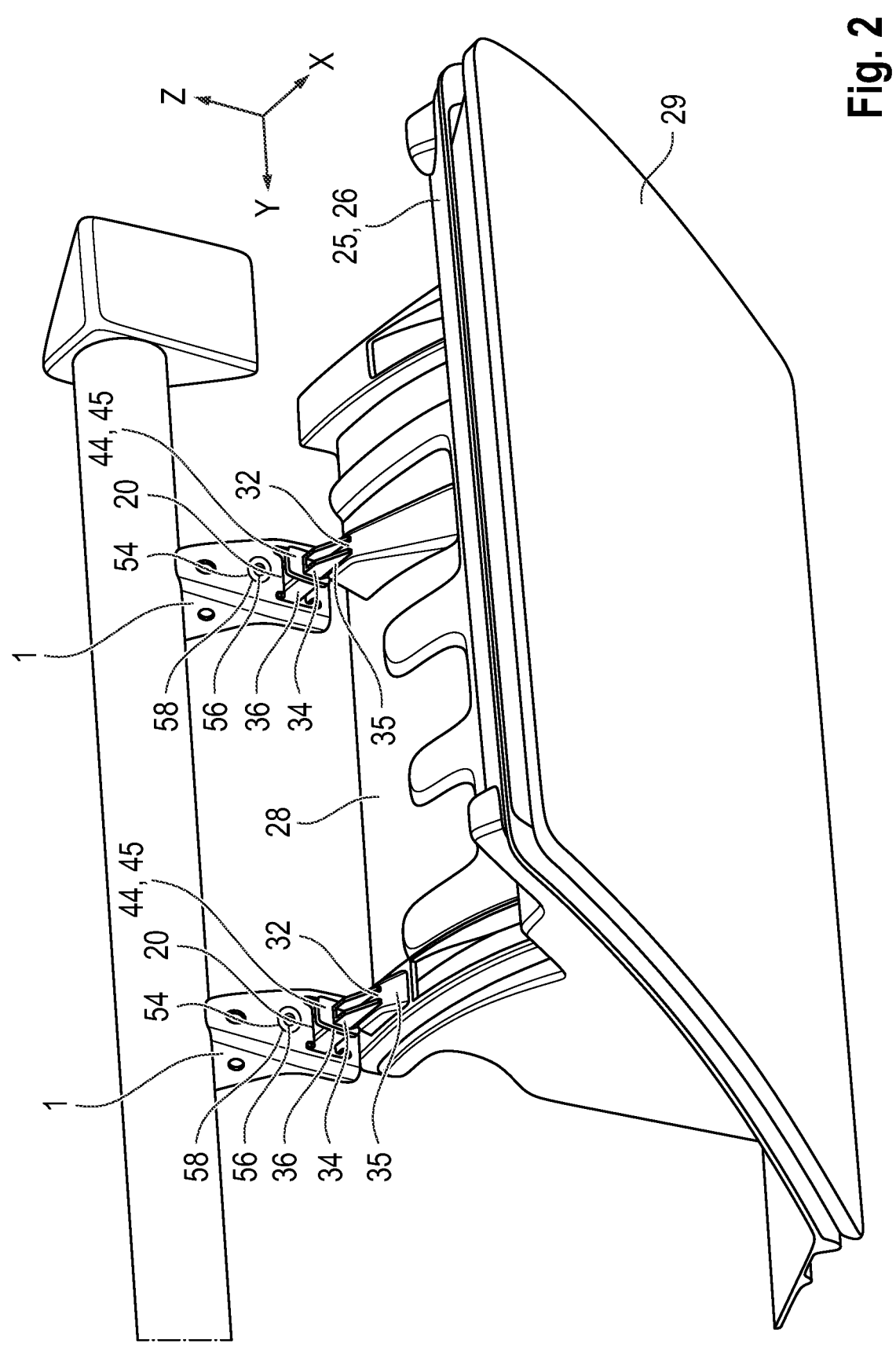

In FIG. 2—for better recognizability of the aspects according to the invention—the component assembly is shown without the first component 2 described above, which is actually preferably already assembled. The component assembly comprises as a further (second) component 25 a glove compartment 26, which has a glove box 28 and a glove compartment lid 29 in a manner known per se and therefore only cursorily described. The glove compartment lid 29 can be swiveled about a swivel axis to allow for access to the glove box 28 or the insertion or removal of objects into or out of it.

The glove box 28 has two external projections (box projections) 32 oriented forward in the longitudinal direction of the vehicle X. The box projections 32 are designed as ribs 34 and are made in one piece from the material of the glove box 28, so that their rib base 35 merges directly into the glove box. The free ends 36 of the ribs 34 penetrate the same recess 20 of the respective retaining element 1 as the mounting aids 14 of the first component 2 (see FIGS. 1 and 3).

Figure 3:
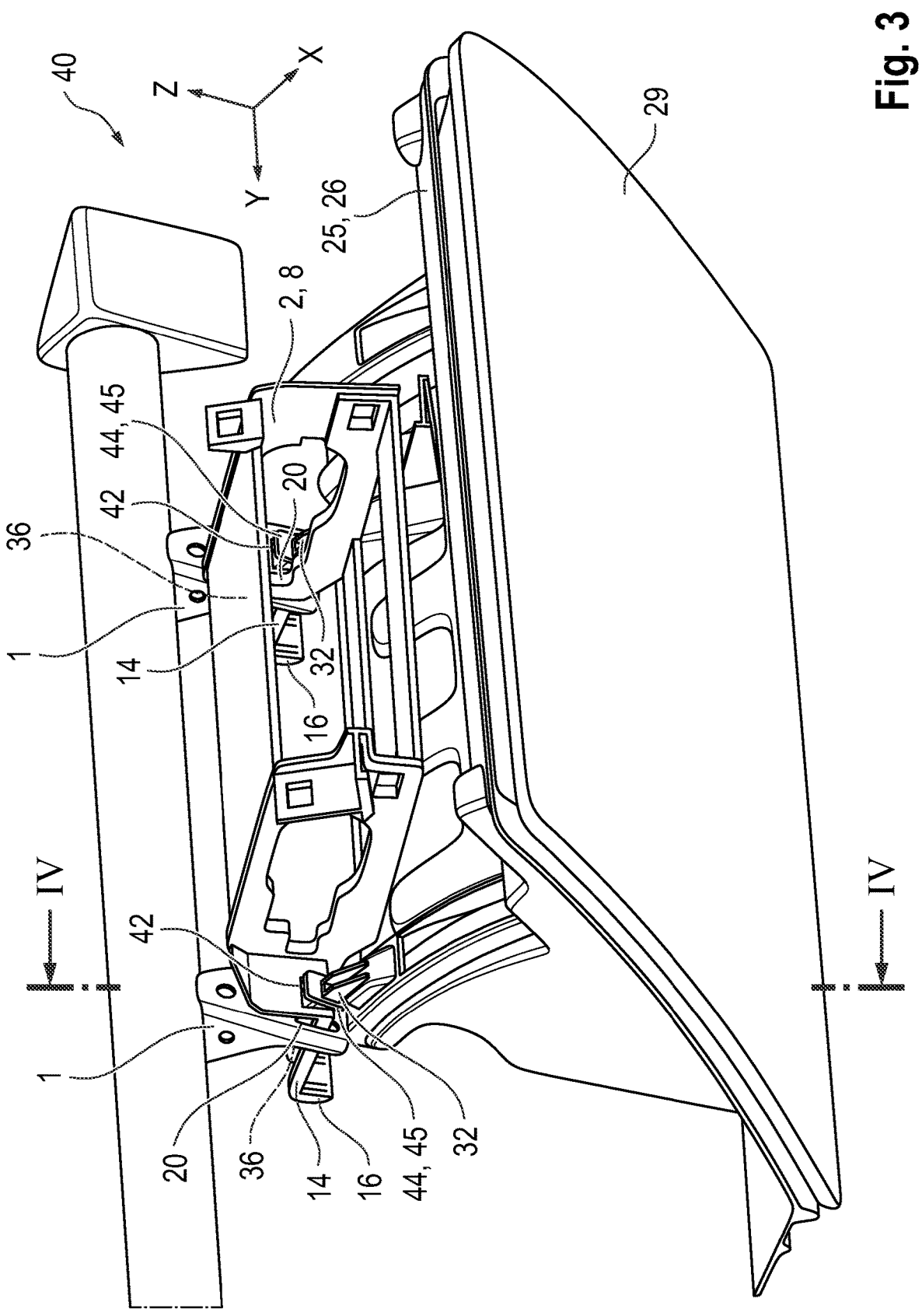

FIG. 3 shows the assembled state 40 of a component assembly with the component 2 (device holder 8) and the component 25 (glove box 26), which are connected to, or stored and held by the retaining elements 1. In the mounted state 40, the mounting aids 14 penetrate the recess 20 in the respective retaining element 1, as described above. The device holder 8 is provided on both sides at the base of the mounting aid 14 with a passage recess 42, through which a box projection 32 with its free end is passed. The passage recess 42 does not have to be a material-limited recess over the entire circumference: In the context of the invention, this is also to be understood as a clearance, which is in any case dimensioned in such a way that it offers sufficient passage space for the respective box projection 32.

Each box projection 32 is inserted with its free end 36 into an elastic element 44 in the form of a rubber sleeve or a rubber buffer 45 (see also FIGS. 2 and 6), which in turn penetrates the passage recess 42 and the recess 20. This ensures a firm fixation of the glove compartment 26 that is nevertheless damped against vibrations. This is also important because the plastic material of the glove box, especially at higher temperatures, would otherwise not remain dimensionally true in every case, so that undesirable gap changes could occur between the upper edge of the glove compartment lid 29 and a surrounding dashboard panel.

For further explanation of the bearing of the first component 2 in a perspective that is essentially contrary to the view of FIGS. 1 to 3, FIG. 4 shows the passage of the mounting aid 14 or the mounting hook 16 through the recess 20 of the retaining element 1.

Figure 4:
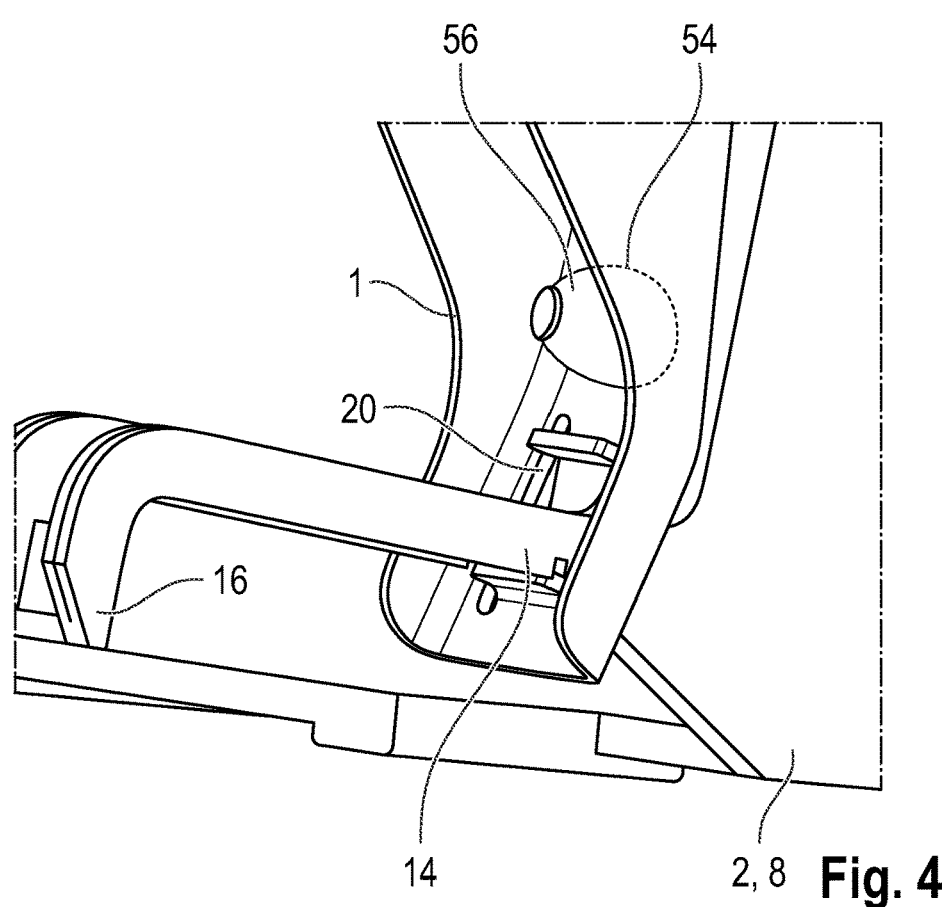
FIG. 4 shows Area A from FIG. 1 in approximately opposite perspective.
Figure 5:
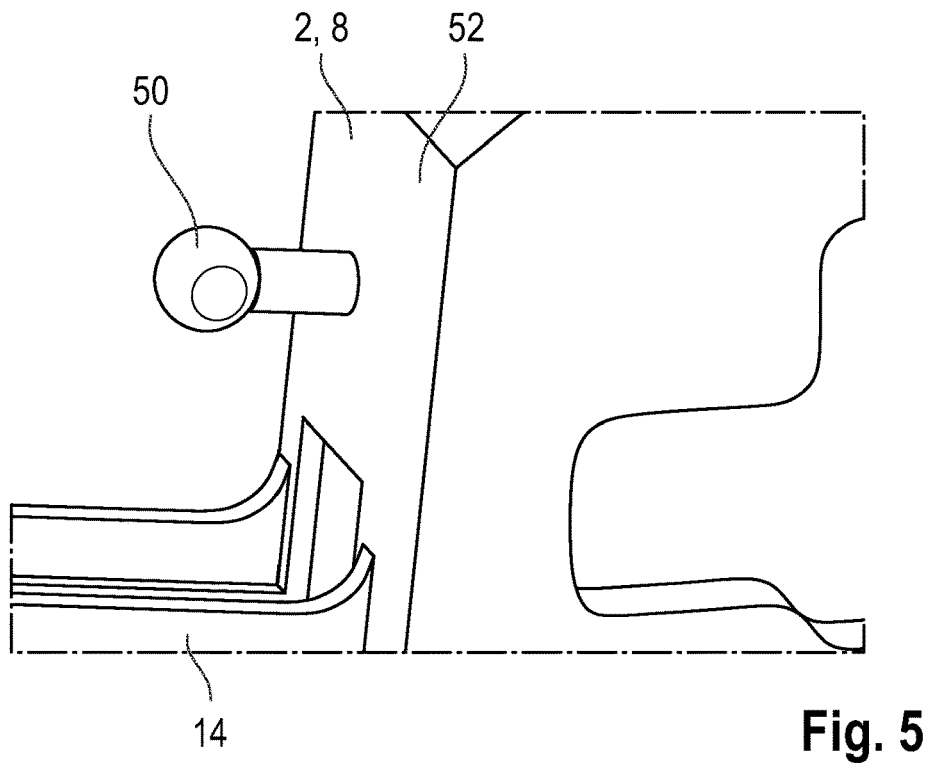
FIG. 5 shows a detail of a first component.

FIG. 5 shows a retaining pin 50 formed at a vertical distance above the mounting aid 14 on an end face 52 of the component 2. In fact, two retaining pins 50 are provided (see also FIGS. 1 and 4), so that in the mounted state, one retaining pin 50 interacts with a corresponding bearing opening 54 (see FIG. 6). As indicated in FIG. 4, the bearing opening may be designed as an opening of a blind-hole-shaped protrusion 56.

Figure 6:
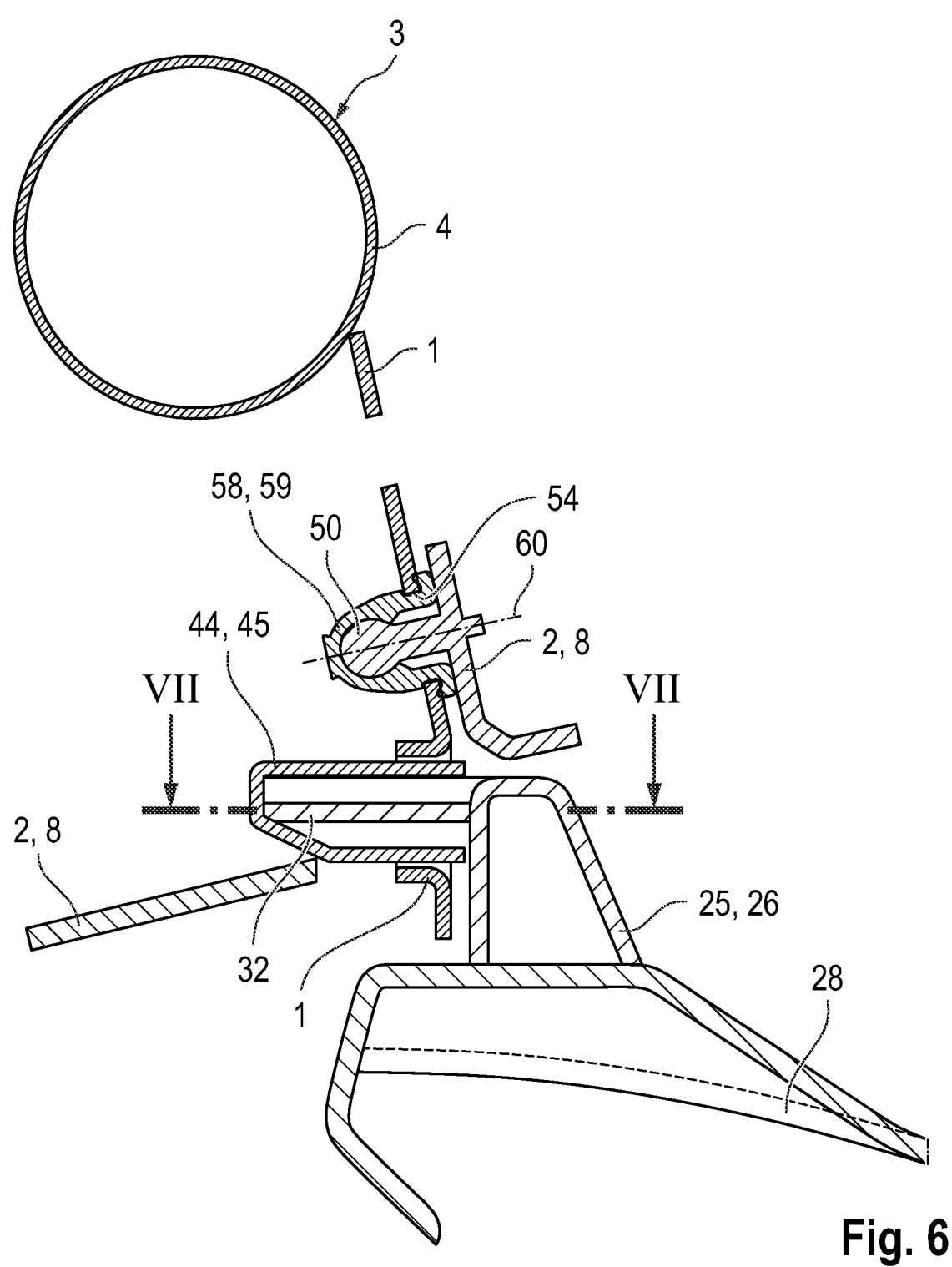
FIG. 6 shows a cross-section along the line IV-IV in FIG. 3.
Figure 7:
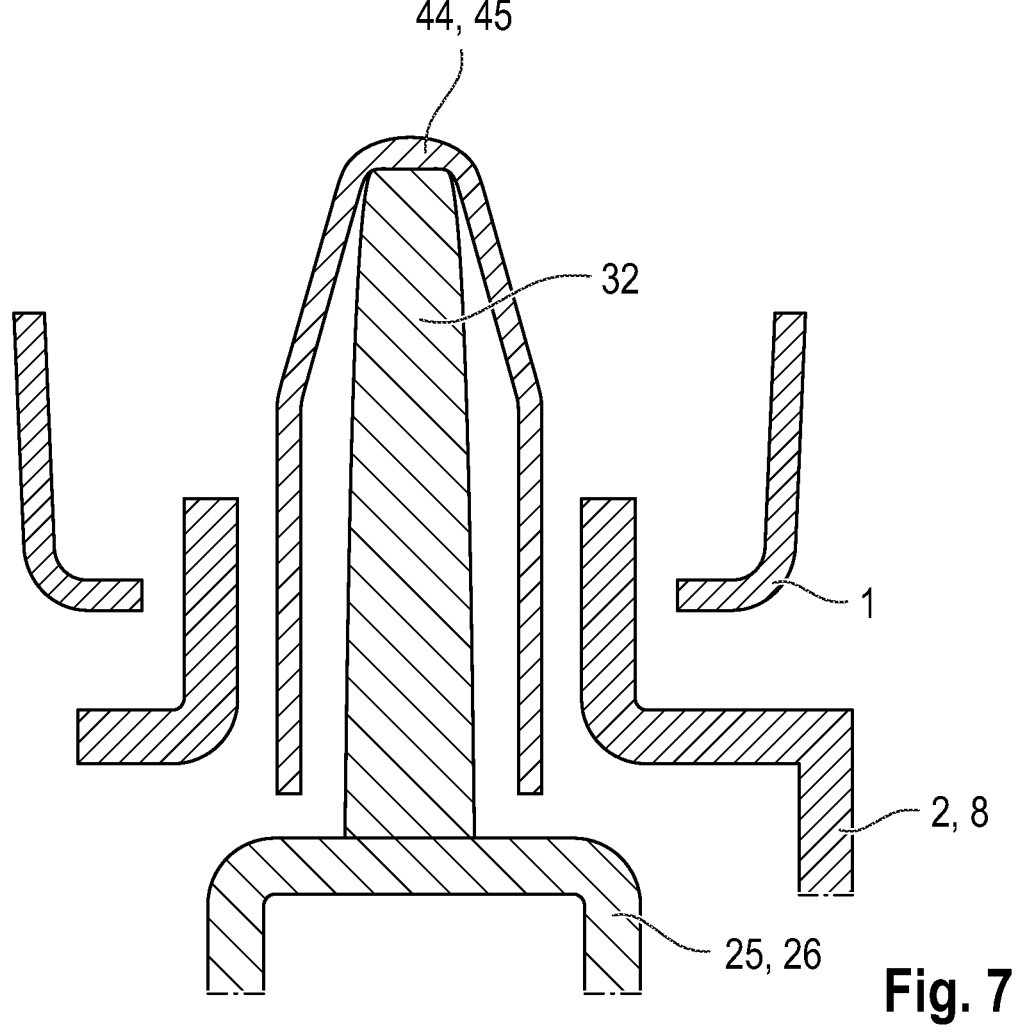
FIG. 7 shows a section along the line VII-VII in FIG. 6.

The elements described above, and in particular the bearings, are further illustrated in FIGS. 6 and 7. The retaining pin 50 is preferably inserted into an elastic element 58 in the form of a rubber sleeve or a rubber buffer 59, which acts as a buffer or attenuator and is inserted into the bearing opening 54 of the retaining element 1.

Alternatively, the first component 2 may be bolted to the retaining element 1, e.g., by inserting a screw along the longitudinal axis 60 of the retaining pin 50, which is only indicated in FIG. 6, which is bolted to the material of the retaining element 1.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A component assembly for a vehicle, the component assembly comprising:

at least two components including a first component having at least one mounting aid and a second component having at least one external projection; and at least one retaining element having a recess, the at least one mounting aid of the first component and the at least one external projection of the second component both being supported in the recess, such that the first and second components are directly or indirectly connectable to a load-bearing vehicle structure of the vehicle via the at least one retaining element.

2. The component assembly according to claim 1, wherein the first component is a device holder for an electrical device, and wherein the second component is a glove compartment with a glove box on which the at least one external projection is arranged.

3. The component assembly according to claim 1, wherein the at least one mounting aid is a mounting hook.

4. The component assembly according to claim 1, wherein the at least one retaining element includes at least two retaining elements.

5. The component assembly according to claim 1, wherein the at least one mounting aid has a passage recess, which is at least partially penetrated by the at least one external projection.

6. The component assembly according to claim 1, wherein at least one elastic element is arranged between the at least one external projection and the at least one mounting aid, at least in sections.

7. The component assembly according to claim 1, wherein the first component has a retaining pin that is mounted in a bearing opening of the at least one retaining element to absorb weight forces and/or acceleration forces.

8. The component assembly according to claim 7, wherein the retaining pin of the first component is supported by an elastic element in the bearing opening of the at least one retaining element.

9. The component assembly according to claim 7, wherein the retaining pin of the first component is bolted to the at least one retaining element and/or to the load-bearing vehicle structure.

* * * * *